United States Patent Office 2,965,575
Patented Dec. 20, 1960

2,965,575
ANTISEPTIC DETERGENT COMPOSITIONS

David J. Beaver, Richmond Heights, and Paul J. Stoffel, Florissant, Mo., assignors to Monsanto Chemical Company, St. Louis, Mo., a corporation of Delaware No Drawing. Filed May 27, 1957, Ser. No. 661,622

10 Claims. (Cl. 252—106)

This invention relates to new and useful antiseptic detergent compositions containing a halogen substituted benzanilide. In particular this invention relates to antiseptic compositions having an organic anionic surface active detergent base or an organic non-ionic surface active detergent base or combination thereof in admixture with a halogen substituted benzanilide of the structure

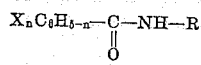

where X is a halogen atom, but preferably chlorine, where n is a whole number from 1 to 3, wherein the radical $X_nC_6H_{5-n}$ is free of substituents ortho to the carbonyl carbon, and where R is a benzenoid hydrocarbon radical containing 1 to 3 halogen substituents, e.g. bromine or chlorine. By "benzenoid hydrocarbon radical" is meant to include phenyl, tolyl, xylyl, ethylphenyl, n-propylphenyl, cymyl, t-butylphenyl, hexylphenyl, cyclohexylphenyl, biphenylyl, and the like. Examples of R are 2-chlorophenyl, 3-chlorophenyl, 4-chlorophenyl; 3-bromophenyl, 4-bromophenyl, 2,4-dichlorophenyl, 3,4-dichlorophenyl, 3,4-dibromophenyl, 3,5-dichlorophenyl, 3,4,5-trichlorophenyl, 3-chloro-4-methylphenyl, 4-chloro-3-methylphenyl, 3-chloro-4-ethylphenyl, 3-chloro-4-n-butylphenyl, 3-chloro-4-biphenylyl, etc. It is preferred that R be a chlor-substituted phenyl radical. Examples of $X_nC_6H_{5-n}$ are 3-chlorophenyl, 3,4-dichlorophenyl, 3,5-dichlorophenyl, 3,4,5-trichlorophenyl, 4-bromophenyl, 3,4-dibromophenyl. The total halogen substituents of said halogen substituted benzanilide must be at least 3.

As illustrative of the preparation of the halogen substituted benzanilides of the antiseptic detergent compositions of this invention are the following:

Example I

To a suitable reaction vessel equipped with a thermometer, agitator and reflux condenser and containing 12.7 parts by weight of p-chloroaniline in 80 parts by weight of pyridine is added dropwise over a period of about 30 minutes 20.9 parts by weight of 3,4-dichlorobenzoyl chloride. When the initial exothermic rise in temperature abates, the mix is agitated for 1 hour to complete the reaction and added to 1000 parts by weight of cold water. The mass is filtered and the filter cake recrystallized from ethanol. The product so obtained as white needles is identified as 3,4,4'-trichlorobenzanilide, M.P. 167.3–168.1° C.

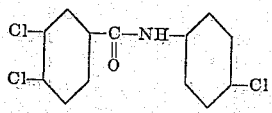

Employing the procedure of Example I but replacing p-chloroaniline with an equimolecular amount of m-chloroaniline, 3,3',4-trichlorobenzanilide is obtained.

Employing the procedure of Example I but replacing 3,4-dichlorobenzoyl chloride with an equimolecular amount of 3,5-dichlorobenzoyl chloride, 3,5,4'-trichlorobenzanilide is obtained.

Example II

To a suitable reaction vessel equipped with a thermometer, agitator and reflux condenser and containing 16.3 parts by weight of 2,5-dichloroaniline in 75 parts by weight of pyridine is added dropwise over a period of about 30 minutes 21.0 parts by weight of 3,4-dichlorobenzoyl chloride. When the initial exothermic rise in temperature abates, the mix is agitated for 1 hour to complete the reaction and added to 300 parts by weight of cold water. The mass is filtered and the filter cake recrystallized from ethanol. The product so obtained as white needles is identified as 2',3,4,5'-tetrachlorobenzanilide, M.P. 178.2–178.6° C.

Example III

To a suitable reaction vessel equipped with a thermometer, agitator and reflux condenser and containing 16.3 parts by weight of 3,4-dichloroaniline in 75 parts by weight of pyridine is added dropwise over a period of about 30 minutes 20.9 parts by weight of 3,4-dichlorobenzoyl chloride. When the initial exothermic rise in temperature abates, the mix is agitated for 4 hours to complete the reaction and added to 1000 parts by weight of cold water. The mass is filtered and the filter cake recrystallized from acetone. The product so obtained as white needles is identified as 3,3',4,4'-tetrachlorobenzanilide, M.P. 232.6–233.3° C.

Example IV

Employing the procedure of Example III but replacing 3,4-dichlorobenzoyl chloride with an equimolecular amount of 4-chlorobenzoyl chloride there is obtained 4,3',4'-trichlorobenzanilide.

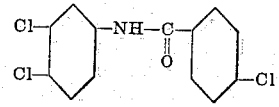

M.P. 176.6–177.4° C.

As aforementioned organic cleansing detergents having an organic anionic surface-active detergent base (or mixture of such organic anionic compounds as the detergent base) or organic non-ionic surface-active detergent base (or mixture of such non-ionic compounds as the detergent base) or combinattion of an anionic and non-ionic organic surface-active agents as the detergent base, are rendered highly antiseptic by incorporating therein the aforedescribed halogen substituted benzanilides. While organic detergents (i.e. the anionic and non-ionic surface-active detergents characterized by having a molecule which carries a hydrophobic tail and a hydrophilic head, wherein the hydrophilic head points toward water while the hydrophobic tail points away from water) are capable of washing large quantities of bacteria and other micro-organisms off surfaces, relatively appreciable numbers of such organisms remain on the surface and continue to multiply. In order to remove this residue it has usually been necessary to use a separate treatment with some disinfectant agent. A combined single step procedure would be most desirable. However, the problem is not simple to solve on a commercial scale in an economical manner inasmuch as the organic detergents destroy the bactericidal efficacy of nearly all disinfectants. In order to be of universal application the bacteriostat must not lose its activity in the presence of the organic detergent, it should be active at low concentrations, it should be non-toxic to animals, non-irritating to the skin, and have some affinity for the skin so that after rinsing a small amount will remain and exert a bacteriostatic effect. The halogen substituted benzanilides of this invention, when admixed with an organic detergent, such as an anionic surface-active detergent or non-ionic surface-active detergent or combination thereof, satisfy all of these requirements.

In order to illustrate the preferred embodiment of this invention several of the halogen substituted benzanilides (specifically 3,4,4'-trichlorobenzanilide, 3,4,3'-trichlorobenzanilide, 4,3',4'-trichlorobenzanilide) of this invention were incorporated in an alkali metal fatty acid soap, specifically an "Ivory" brand neutral high grade white toilet soap (a mixture of alkali metal salts of fatty acids whose fatty acid content analyzes

|   | Percent |
|---|---|
| Oleic and linoleic acid | About 46 |
| Stearic acid | About 14 |
| Palmitic acid | About 30 |
| Lower fatty acids (myristic, lauric, etc.) | About 10 |

The respective compounds were incorporated in the said "Ivory" brand toilet soap in a weight ratio of one part to 50 parts soap. Aliquots of each were added to a Sabourard's dextrose agar medium so as to give a concentration of 1 part per ten thousand. The agar in each case was then poured into a petri dish, allowed to harden and then inoculated with a standard culture of *Micrococcus pyogenes* var. *aureus* of standard resistance. The incubation in each instance was made at 37° C. for 48 hours. All showed effective control of *Micrococcus pyogenes* var. *aureus*.

Replacing the foregoing "Ivory" brand soap with an equal weight of a "Lux" brand solid neutral white toilet soap (a mixture of alkali metal salts of fatty acids whose fatty acid content analyzes about 45% oleic and linoleic acid, about 30% palmitic acid, about 10% stearic acid, and about 15% lower fatty acids) the same results are obtained. The same results are also obtained using instead of a solid soap a liquid soap, such as that having a 40% alkali metal fatty acid soap content prepared from an alkali metal compound and a mixture of fatty acids obtained from a mixture of 75% coconut oil and 25% olive oil. Other alkali metal fatty acid soaps may also be used, e.g. the usual alkali metal (sodium and/or potassium) soaps of higher fatty acids of vegetable or animal origin, such as stearic, lauric, palmitic, oleic, linoleic, ricinoleic, and the like, or mixtures thereof obtained from tallow, lard, coconut oil, palm oil, castor oil, olive oil, hydrogenated cottonseed oil, and the like.

The organic anionic detergents of this invention include in addition to the preferred alkali metal fatty acid soaps the well known surface-active alkali metal sulfonates and sulfates, which may be employed as the sole detergent base or in admixture with the alkali metal fatty acid soaps (e.g. one part of the fatty acid soap to 0.5 to 2 parts by weight of the surface-active alkali metal sulfonate or sulfate or mixtures thereof) as the detergent base. A preferred group of this class is the long chain alkyl aryl sulfonates, i.e. those wherein the alkyl radical is straight or branched in structure and contains from 8 to 22 carbon atoms, but preferably 10 to 16 carbon atoms, examples of such being octyl, decyl, dodecyl, keryl, pentadecyl, hexadecyl, octadecyl, mixed long chain alkyls derived from long chain fatty materials such as the lauryl radical, cracked paraffin wax olefins, polymers of lower mono-olefins such as propylene tetramer and the like, and wherein the aryl radical is derived from benzene, toluene, xylene, phenol, the cresols, naphthalene, and the like. Specific examples of such comprise sodium decyl benzene sulfonate, sodium dodecyl benzene sulfonate, sodium lauryl benzene sulfonate and sodium hexadecyl benzene sulfonate.

Other sulfonate surface-active agents are contemplated also, e.g. the long chain alkyl sulfonates such as sodium hexadecane sulfonate and sodium octadecane sulfonate.

The well known sulfate detergents having 12 to 26 carbon atoms and particularly those having an alkyl radical of about 8 to 22 carbon atoms may be employed as anionic detergent bases in accordance with this invention. Such detergents include the sulfuric acid esters of polyhydric alcohols incompletely esterified with fatty acids, e.g. sodium coconut oil mono-glyceride monosulfate, sodium tallow diglyceride monosulfate, the pure and mixed higher alkyl sulfates such as sodium lauryl sulfate and sodium cetyl sulfate.

Additional anionic surface-active sulfonates and sulfates contemplated by this invention include the sulfated and sulfonated alkyl acid amides such as Igepon T ($C_{17}H_{33}CONHCH_2CH_2SO_3Na$); the sulfated and sulfonated esters such as Igepon AP ($RCOOCH_2SO_3Na$ where R is an alkyl radical containing from 12 to 18 carbon atoms), sodium salt of the bisulfate of a dialkyl dicarboxylate, sodium salt of the sulfonic acid derivative of a dialkyl dicarboxylate, sodium salt of sulfosuccinic acids such as $NaOOCCH_2CH(SO_3Na)CONHC_{18}H_{37}$, and the like.

In addition to the anionic surface-active agents the non-ionic surface-active agents containing a halogen substituted benzanilide of this invention provide antiseptic compositions. The non-ionic surface-active agents contemplated are viscous liquid to wax-like water-soluble surface-active substances containing a polyglycol ether group of the structure

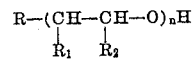

wherein $R_1$ and $R_2$ are hydrogen or short chain alkyl, where $n$ is an integer greater than 3, and where R is a residue of a compound of a monomeric organic compound having an active hydrogen, e.g. alcohols, phenols, amides, primary amines, secondary amines, carboxylic acids, etc. These non-ionic detergents are well known (note U.S. 1,970,578 and U.S. 2,213,477) and may be typified by the polyalkylene oxide derivatives (i.e. polyethylene oxide, polypropylene oxide, polybutylene oxide) of water-insoluble higher fatty acids, such as lauric, oleic, palmitic, and stearic acid and the like or mixtures thereof, such as the mixtures of fatty acids, obtained from animal and vegetable fats and oils or by oxidation of petroleum fractions such as paraffin wax. They may also be exemplified by the polyalkylene oxide derivatives of such water-insoluble organic hydroxy compounds as higher aliphatic alcohols (i.e. the alcohols corresponding to the fatty acids specified above or mixtures thereof), phenols, particularly alkyl phenols containing at least six alkyl carbon atoms such as isooctyl-, di-tertiary butyl-, triisopropyl-, nonyl-, dodecyl-, octadecyl- phenols or naphthols, or of higher alkyl alcohols, such as benzyl alcohol, cinnamyl alcohol. They may also be exemplified by the polyalkylene oxide derivatives of such amines as stearyl, lauryl, dicyclohexyl, dibutyl amine and the like. A particularly useful non-ionic detergent is that obtained by condensing one mol of tall oil with 5 to 15 mols of ethylene oxide.

The halogen substituted benzanilides of this invention may be employed in detergent compositions or detergent base cosmetic compositions ordinarily used to beautify, cleanse or protect the skin in any amount sufficient to control the growth of or to kill bacteria, specifically *Micrococcus pyogenes* var. *aureus*, normally present on the skin. Relatively small amounts of the halogen substituted benzanilides of this invention in cosmetics, particularly those having as a base an anionic or non-ionic organic detergent base composition or combination of said detergents, have been found to yield effective antiseptic compositions. With respect to cosmetics having an anionic or non-ionic detergent base amounts as low as 0.1% to 1% by weight based upon the total weight of the organic detergent may be employed. It is preferred in detergent cleansing compositions having an anionic detergent base or non-ionic detergent base to employ these halogen substituted benzanilides in amounts in the order of 1% to 3% by weight based on the total weight of detergent. While larger amounts with respect to the detergent base may be employed, the upper limit will be determined by practical considerations as well as by the particular cosmetic composition involved, i.e. whether the composition is to be used for cleansing purposes in the sense of a toilet soap or as a shaving cream or as a shampoo, etc. In cleansing compositions in the sense of a toilet soap containing an anionic organic detergent base (e.g. an alkali metal fatty acid detergent soap alone or in admixture with another anionic organic detergent such as the aforedescribed sodium alkyl aryl sulfonate detergents) or non-ionic detergent base, the amount of halogen substituted benzanilides of this invention ordinarily will not exceed 10% by weight of the detergent base. However, in shampoos, shaving creams, and the like, employing an anionic detergent organic base or non-ionic detergent base the amounts of the halogen substituted benzanilides of this invention may be present to the extent of 50% by weight based on the total detergent base content. Various colors, antioxidants, perfumes, water-softeners, salts such as silicates, chlorides, carbonates, phosphates and sulfates of alkali metals and like builders, sodium carboxy methyl cellulose, the low molecular weight alcohols such as methanol, ethanol, isopropanol, ethylene glycol, and the like, may be included where desirable.

While this invention has been described with respect to certain embodiments it is not so limited and it is to be understood that variations and modifications thereof obvious to those skilled in the art may be made without departing from the spirit or scope of this invention.

This application is a continuation-in-part of application Serial Number 465,432, filed October 28, 1954, now abandoned.

What is claimed is:

1. An antiseptic detergent composition comprising an organic detergent selected from the class consisting of anionic detergents, non-ionic detergents and mixtures thereof and 0.1 to 50% by weight based on said detergent of a halogen substituted benzanilide of the structure

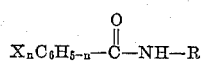

where X is a halogen selected from the group consisting of chlorine and bromine, where $n$ is a whole number from 1 to 3, where the radical $X_nC_6H_{5-n}$ is free of substituents ortho to the carbonyl carbon, and where R is a halogen substituted benzenoid hydrocarbon radical containing from one to three halogens selected from the group consisting of chlorine and bromine, the total number of halogen substituents in said benzanilide being at least 3.

2. An antiseptic detergent composition comprising an organic anionic detergent and 0.1 and 50% by weight of a chloro-substituted benzanilide of the structure

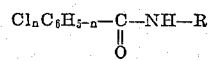

where $n$ is a whole number from 2 to 3, where the radical $Cl_nC_6H_{5-n}$ is free of substituents ortho to the carbonyl carbon atom and where R is a chloro-substituted phenyl radical containing from 1 to 3 chlorine atoms the total number of halogen substituents in said benzanilide being at least 3.

3. The composition of claim 2 wherein the organic anionic detergent is an alkali metal fatty acid soap.

4. An antiseptic detergent composition comprising an alkali metal fatty acid soap and 0.1 to 10% based on said soap of 3,4,4'-trichlorobenzanilide.

5. An antiseptic detergent composition comprising an alkali metal fatty acid soap and 0.1 to 10% based on said soap of 3,3',4-trichlorobenzanilide.

6. An antiseptic detergent composition comprising an alkali metal fatty acid soap and 0.1 to 10% based on said soap of 4,3',4'-trichlorobenzanilide.

7. An antiseptic detergent composition comprising an organic non-ionic detergent and 0.1 to 50 percent by weight of a chloro-substituted benzanilide of the structure.

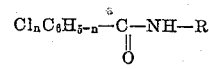

where $n$ is a whole number from 2 to 3, where the radical $Cl_nC_6H_{5-n}$ is free of substituents ortho to the carbonyl carbon atom and where R is a chloro-substituted phenyl radical containing from 1 to 3 chlorine atoms.

8. The method of controlling the growth of *Micrococcus pyogenes* var. *aureus* on a surface which comprises cleansing said surface with the composition of claim 1.

9. The method of controlling the growth of *Micrococcus pyogenes* var. *aureus* on a surface which comprises cleansing said surface with the composition of claim 2.

10. The method of controlling the growth of *Micrococcus pyogenes* var. *aureus* on a surface which comprises cleansing said surface with the composition of claim 3.

References Cited in the file of this patent

UNITED STATES PATENTS

| | | |
|---|---|---|
| 2,353,735 | Kunz et al. | July 18, 1944 |
| 2,393,673 | Wyss et al. | Jan. 29, 1946 |
| 2,643,965 | O'Brien et al. | June 30, 1953 |
| 2,678,302 | Beaver et al. | May 11, 1954 |
| 2,703,332 | Bindler et al. | Mar. 1, 1955 |
| 2,731,386 | Reiner | Jan. 17, 1956 |

OTHER REFERENCES

Shirley Inst. Mem. 9:27–51 (1930), Brit. Cotton Ind. Research Assoc., Shirley Inst., Didsbury, Eng., article by Fargher et al.

U.S. Dept. Agri., Bulletin No. E–789, November 1949, pages 9, 12, 13, 17, and 20.